Sept. 7, 1965  F. V. F. PAUL  3,205,119
REINFORCEMENTS FOR OBJECTS MADE FROM
RUBBER OR PLASTIC MATERIAL
Filed Feb. 14, 1962  2 Sheets-Sheet 2

United States Patent Office 3,205,119
Patented Sept. 7, 1965

3,205,119
REINFORCEMENTS FOR OBJECTS MADE FROM RUBBER OR PLASTIC MATERIAL
Francis Victor Frédéric Paul, Paris, France, assignor to Societe Anonyme dite: Pneumatiques et Caoutchouc Manufacture Kleber Colombes, Colombes, France
Filed Feb. 14, 1962, Ser. No. 173,294
Claims priority, application France, Feb. 16, 1961, 853,155; June 14, 1961, 865,108, Patent 84,201; Aug. 22, 1961, 871,471, Patent 1,334,318; Sept. 26, 1961, 874,261, Patent 84,202
4 Claims. (Cl. 161—91)

Reinforcements for objects made from rubber or plastic material should simultaneously have the qualities which hitherto-used, woven or unwoven fabrics do not possess. This depends upon the nature of the textiles and the structure of the fabrics used.

Cotton and other textiles, such as broom, jute, flax and similar staple fibre materials, are easy to use but the reinforcements made with these textiles cannot have more than a certain resistance since beyond this, the number of plies necessary to give them transverse and longitudinal rigidity would be generally inadmissable.

Moreover, cotton reinforcements for example, have very poor resistance to the shocks, impacts and severe blows to which certain reinforcements, such as those of some conveyor belts used in mines, are submitted.

It has been suggested to use fabrics of synthetic textiles such as polyamides on account of their high mechanical resistance, but the reinforcements constituted by such fabrics are inflammable which is a serious drawback; an object made from rubber or plastic material should generally remain non-inflammable even if the coatings are accidently removed. In order to remedy this drawback, it was proposed to associate a polyamide reinforcement with a thermoplastic mixture having a polyvinyl chloride base. But such objects remain inflammable, particularly when the coating is accidently removed.

It has also been suggested that crossed fabrics be used, constituted by one or more textiles, but serious miscalculations resulted from the lack of homogeneity of the reinforcements thus constituted and the difference in the mechanical characteristics of the constitutent elements.

Reinforcements constituted by non-woven fabric plies were also used, formed by elements arranged parallel to one another and assembled by calendering in an elastic mixture, but the construction of such reinforcements presents many difficulties and necessitates a considerable amount of equipment.

The present invention has for an object a reinforcement which simultaneously offers the qualities which, hitherto, could only be obtained separately; resistance, flexibiliy, non-inflammability, limited lengthening, and ease of manufacture.

The present invention relates in particular to reinforcements for conveyor belts and particularly for conveyor belts having a coating of a mixture with a polyvinyl chloride base, but it also relates to belts the coating of which is a mixture having a natural or synthetic rubber base.

The present invention also relates to reinforcements for drive belts, pipes and in general all those articles made from reinforced rubber or plastic material.

According to the present invention, at least one layer of the reinforcement of an object made from a plastic material or from natural or synthetic rubber is constituted by a "non-smeared" fabric in which the warp threads are those which bear the longitudinal tension and are made from a textile chosen because of this function and wherein the weft threads are, on their periphery at least, made from another textile chosen especially because of its qualities in relation to the mixture in which the reinforcement is embedded, for example adhesion to this mixture and the qualities it shows when associated with this mixture such as non-inflammability.

"Smear" is the term used to designate the sinuosity which causes the warp threads and the weft threads to interlace in a woven fabric.

"Non-smeared fabric" is the name given to a fabric in which the warp and weft threads do not interlace. It is a fabric wherein the warp threads and the weft threads are superposed without being woven, the cohesion of the fabric being assured by binding threads.

According to another feature of the invention, the binding threads are as fine as possible in order to occupy a minimum amount of space.

In order that the invention may be better understood we refer to the following examples, illustrated by the corresponding drawings.

FIGURES 1 and 2 diagrammatically show, without keeping to scale, a fabric which, according to the invention, is used to form at least one layer of the reinforcement of a rubber or plastic material object, the figures, respectively, illustrate this fabric in section along the direction of the warp and in section along the direction of the weft;

Figure 1:
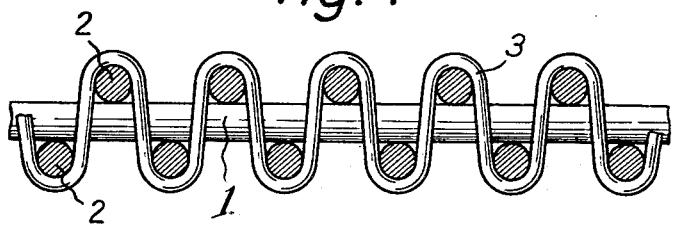
Figure 2:
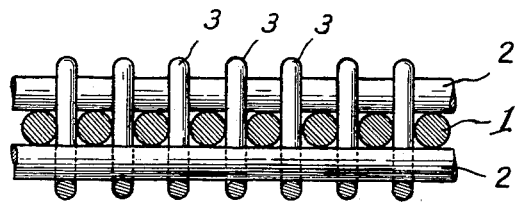

As shown in FIGURES 1 and 2, the improved fabric of this invention has weft threads 2 arranged on either side of the warp threads 1 without being woven therewith. The binding threads 3 which ensure the cohesion of the fabric are arranged in the direction of the warp threads.

Warp threads 1 which carry the longitudinal stresses are of any textile, natural, artificial or synthetic, chosen as a function of its mechanical characteristic and also other qualities which may be required for the reinforcement. They may, for example be made from a polyamide such as nylon. In the case in which it is desired to obtain a reinforcement having a small degree of extensibility when in use, the warp threads are formed of a textile which, to its good mechanical qualities, adds the property of having a low degree of extensibility, for example, a polyester such as that known under the trademark Tergal, or rayon.

The weft threads 2 are of a textile chosen by reason of the properties it possesses in relation to the material constituting the mixture in which the reinforcements are embedded and the properties it shows when associated with this material. Moreover it is also chosen as a function of the mechanical characteristics which it is desired to impart to the belt in the transverse direction.

Generally, a fabric is used, the weft of which is of the textile which is easily made to adhere or which it is known to be easy to make to adhere to the mixture wherein the reinforcement is embedded and which, when it is associated with this mixture, is non-inflammable or may be easily made non-inflammable.

If the mixture has a polyvinyl chloride base, it is worth constituting the weft elements of cotton, flax, or broom and staple fibres or other similar textiles. Cotton, which easily adheres to mixtures having a polyvinyl chloride base and which is not inflammable when impregnated by these mixtures, has given excellent results.

It is possible that the textile having the required properties of adhesion and non-inflammibility, does not have the mechanical qualities necessary to give the belt the required mechanical characteristics in the transverse direction.

Figure 7:
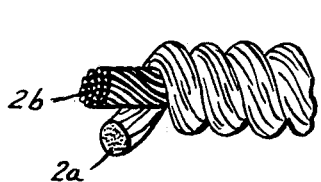
FIGURE 7 is an enlarged fragmentary view, partially in section and partially in elevation, of one form of weft cord.

According to another feature of the invention, a "non-smeared" fabric may be used wherein the weft elements are constituted by a "central strand" of a textile having the desired mechanical qualities, coated by a textile having the qualities desired for the weft elements, other than the mechanical ones. The weft elements may, for example, be formed by one or more rayon, polyester or polyamide monofilaments covered with staple textile fibres, selected from the class consisting of cotton, jute, flax and broom. in the manner well known in the textile industry. Such threads may be formed by lapping a strand 2a of staple fibres about one or more monofilaments 2b, see FIG. 7.

Figure 8:
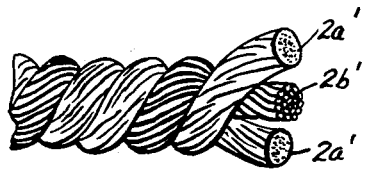
FIGURE 8 is a view similar to FIGURE 7 but showing another form of weft cord.

It is also possible to use fabrics, the weft elements of which are obtained by stranding together, as shown in FIG. 8, one or more threads 2b' of a high resistance textile such as nylon, rayon or polyester with one or more threads 2a' of a textile, selected from the class consisting of cotton, jute, flax and broom fibres, which has the desired quality in respect of the mixture.

The binding threads are as fine as possible in order to occupy a minimum of space and to expose the weft elements to a maximum. They are made from a very high resistance textile, such as a polyamide, for example. If, as in this embodiment, the layer of warp threads is inserted between two layers of weft threads, the corresponding weft elements may be located in the same transverse section or may be staggered in relation to one another as shown in FIGURE 1.

In many cases it is useful, when constituting the reinforcement, to use a fabric such as that previously defined wherein the weft elements are located very close to one another to the point of almost entirely covering the layer constituted by the warp threads. In this case, the two ply faces of the reinforcement which come into contact with the rubber or plastic material are constituted by the textile of the weft elements, which has been chosen precisely because of the qualities it possesses in relation to this mixture and when associated therewith. The layer formed by the warp elements, enclosed by the two layers of weft elements which almost entirely cover them, does not directly touch the rubber or plastic material. It is therefore possible to select the textile for the warp elements as a function of the mechanical qualities required for the finished object, in the warp direction, said qualities being mechanical resistance, and lengthening limit, while practically neglecting the disadvantages which this textile may have with regard to the rubber or plastic material.

It is advantageous that the binding threads be very thin so as to occupy a minimum space, and cover the weft elements as little as possible so that it is the textile of the weft elements which are generally in contact with the mixture.

It is also possible, according to the present invention, to use, when constituting the reinforcements of rubber or plastic material objects, a non-smear fabric wherein only one layer of the weft elements is associated to a layer of longitudinal elements. In this case the binding threads are arranged in the weft direction and in the warp direction so as to form a network wherein the warp and weft elements are enclosed.

Figure 3:
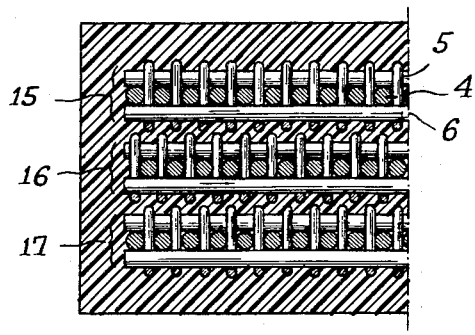
FIGURE 3 is a somewhat diagrammatic sectional view of a conveyor belt reinforced with three plies of the fabric illustrated in FIGURES 1 and 2.

FIGURE 3 diagrammatically shows, in cross-section, a conveyor belt, the reinforcement of which is constituted by three plies 15, 16, 17 of a non-smeared fabric of the type illustrated in FIGURES 1 and 2.

The reinforcement is embedded in a non-inflammable and antistatic mixture having a polyvinyl chloride base.

Each ply is constituted by a non-smeared fabric wherein the layer of warp elements 4 is enclosed by two layers of weft elements 5. The binding threads 6 are arranged in the direction of the warp only.

The warp elements are made from a polyamide which is commercially sold in France under the name Nylon T.A.P. Each warp element is constituted by four strands of 840 denier.

The weft elements which almost entirely mask the longitudinal layers are of cotton. They are constituted by six threads of stranded Egyptian cotton with a metric number 12.

The binding threads arranged only in the warp direction, are made from a polyamide commercially sold under the name Nylon T.A.P. They are constituted by one strand of 420 denier.

The fabric comprises 40 warp elements for each 10 cm. of width and 100 weft elements for each 10 cm. of length or 50 weft elements for each 10 cm. of length in each of the two layers enclosing the warp elements. The weft elements are slightly staggered in relation to one another.

This belt, the work limit of which is 315 kg./cm., is manufactured according to known methods.

Although it is not necessary to do so, the different plies may be submitted to a known treatment in order to cause the polyamides to adhere to the polyvinyl chloride. Better results are thus obtained than when this adhesion treatment is not effected.

In the belt thus manufactured, the adherence between the different plies and between the reinforcement and the coatings is remarkable and even better than that obtained with the conventional fabrics made solely from cotton.

Thus in the weft direction, the adherence is in the order of from 4–5 kg./cm. and, in the warp direction is in the order of 8–9 kg./cm. (under the same conditions, the adherence of a conventional fabric made entirely from cotton is in the order of from 4–5 kg.).

The longitudinal flexibility of this belt is also remarkable. It may be wound an almost unlimited number of times around a cylinder, having a diameter of 100 mm.

In the transverse direction, its structure is satisfactory.

Moreover, it is entirely non-inflammable, even if the coatings are removed.

If such a belt is intended for fitting onto conveyors having a large distance between the axles, warp elements are used made from a textile which has a very small degree of lengthening, such as ethylene glycol terephthalate or rayon, the weft elements being, as in the preceding example, made from a textile having good qualities of adhesion in respect of the mixture constituting the coatings and which also have other qualities such as being non-inflammable, when associated with this mixture.

With the reinforcements according to the invention, conveyor belts may be constructed, the resistance limit of which is extremely high as a result of the fact that the textile constituting the longitudinal layers is chosen solely as a function of the mechanical qualities and as a result of the fact that the number of plies may be increased without this causing an inacceptable longitudinal rigidity.

Figure 4:
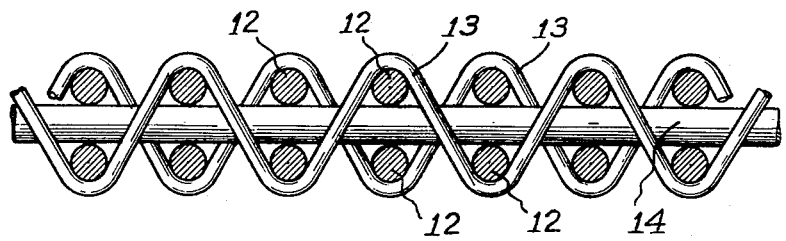
FIGURES 4 and 5 are views similar, respectively, to FIGURES 1 and 2 but illustrating another embodiment of the invention.
Figure 5:
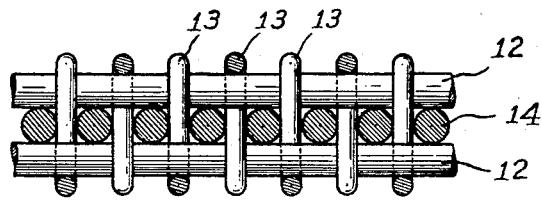

FIGURES 4 and 5 diagrammatically show, a fabric somewhat similar to the one shown in FIGURES 1 and 2, which may be used to form at least one layer of reinforcement for a conveyor belt.

This fabric has the weft threads 12 arranged on either side of the warp threads 14 and the weft elements 12 in the two layers are arranged in the same transverse section. The binding threads 13 are arranged only in the spaces between the warp threads. These binding threads are arranged in pairs with one thread of each pair passing about and uniting only half of the weft threads, the other of the pair of binding threads uniting the other weft threads.

The textile materials constituting the different elements of this fabric are chosen as in the preceding example.

Figure 6:
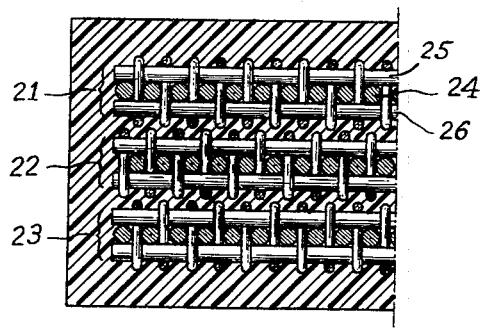
FIGURE 6 is a view similar to FIGURE 3 illustrating a conveyor belt reinforced by three plies of the fabric shown in FIGURES 4 and 5.

FIGURE 6 diagrammatically shows in cross section a conveyor belt, the reinforcement of which is constituted by three plies 21, 22, 23 of the fabric described above. As shown therein, each ply comprises a layer of weft elements 25 on either side of the warp elements 24. The binding threads 26 are arranged in the warp direction only.

I claim:
1. An article of manufacture comprising:
 (a) a layer of parallel, straight, warp cords extending lengthwise of the article with the cords formed of textile fibers selected from the class consisting of linear polyamides, polyesters and rayon;
 (b) a first layer of individual, parallel, weft cords extending transversely of the warp cords between the latter and one outer face of the article;
 (c) a second layer of individual, parallel, weft cords extending transversely of the warp cords between the latter and the outer face of the article opposite the first-named face;
 (d) polyamide binding cords of lesser diameter than said warp and weft cords extending lengthwise of the article and interlooped with the weft cords on opposite sides of said warp cords and passing between said warp cords without interlooping therewith; and
 (e) a continuous covering of flame-resistant flexible material over the said cords;
 (f) the tensile strength of the said warp cords being greater than that of the weft cords and the said weft cords substantially covering the warp cords with the weft cords comprising a material having greater adhesion to said flexible covering than the said warp cords.

2. An article as defined in claim 1 wherein the weft cords are made from a textile selected from the class consisting of cotton, jute, flax and broom fibres.

3. An article as defined in claim 1 wherein the weft elements consist of a central strand formed from a textile having high tensile strength which strand is covered by a wrapping of staple fibres of a textile selected from the class consisting of cotton, jute, flax and broom fibres.

4. An article as defined in claim 1 wherein the weft elements comprise continuous threads of a synthetic textile material selected from the class consisting of linear polyamides, polyesters and rayon twisted with textile fibres selected from the class consisting of cotton, jute, flax and broom fibres.

References Cited by the Examiner

UNITED STATES PATENTS

| | | | |
|---|---|---|---|
| 421,246 | 2/90 | Clouth | 139—415 |
| 1,347,254 | 7/20 | Dankmeyer | 139—426 |
| 1,403,859 | 1/22 | Grupe | 154—52.1 |
| 1,573,559 | 2/26 | Manley | 139—420 X |
| 2,135,057 | 11/38 | Slayter et al. | 154—52.1 |
| 2,211,607 | 8/40 | Reimel | 154—52.1 |
| 2,495,808 | 1/50 | Colmant | 139—408 X |
| 2,793,151 | 5/57 | Arnett. | |
| 2,919,217 | 12/59 | Bobkowicz | 161—57 |
| 2,983,636 | 5/61 | Runton | 154—52.1 |
| 3,002,536 | 10/61 | Lord et al. | 28—80 X |

FOREIGN PATENTS 557,811  5/58  Canada.

DONALD W. PARKER, *Primary Examiner.*
MERVIN STEIN, RUSSELL C. MADER, *Examiners.*